(12) United States Patent
Shani et al.

(10) Patent No.: US 9,792,202 B2
(45) Date of Patent: Oct. 17, 2017

(54) IDENTIFYING A CONFIGURATION ELEMENT VALUE AS A POTENTIAL CAUSE OF A TESTING OPERATION FAILURE

(71) Applicant: HEWLETT PACKARD ENTERPRISE DEVELOPMENT LP, Houston, TX (US)

(72) Inventors: Inbar Shani, Yehud (IL); Roy Nuriel, Yehud (IL); Amichai Nitsan, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/035,053

(22) PCT Filed: Nov. 15, 2013

(86) PCT No.: PCT/US2013/070320
§ 371 (c)(1),
(2) Date: May 6, 2016

(87) PCT Pub. No.: WO2015/073026
PCT Pub. Date: May 21, 2015

(65) Prior Publication Data
US 2016/0283355 A1    Sep. 29, 2016

(51) Int. Cl.
*G06F 9/44* (2006.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| 6,862,696 B1 | 3/2005 | Voas et al. |
| 8,296,736 B2 | 10/2012 | Jones et al. |

(Continued)

FOREIGN PATENT DOCUMENTS

| WO | WO-0246922 A2 | 6/2002 |
| WO | WO-2012066091 A1 | 5/2012 |
| WO | WO-2013115797 A1 | 8/2013 |

OTHER PUBLICATIONS

Evolven Software, "Configuration Management and Change Management Solutions," (Web Page), copyright 2012, 2 pages, available at http://www.evolven.com/solutions/solutions-overview.html.

(Continued)

*Primary Examiner* — Chuck Kendall

(57) ABSTRACT

Examples disclosed herein relate to identifying a configuration element value as a potential cause of a testing operation failure. Examples include causing a testing operation to be performed approximately in parallel on each of a plurality of instances of an application executed in respective testing environments, acquiring configuration element values from each of the testing environments, and identifying at least one of the configuration element values as a potential cause of a testing operation failure.

15 Claims, 3 Drawing Sheets

(56) References Cited

U.S. PATENT DOCUMENTS

| | | | |
|---|---|---|---|
| 8,433,953 | B1 | 4/2013 | Gaudette et al. |
| 2002/0138787 | A1 | 9/2002 | Pal et al. |
| 2006/0265627 | A1 | 11/2006 | Trump et al. |
| 2011/0029956 | A1 | 2/2011 | Ledenev et al. |
| 2011/0029957 | A1 | 2/2011 | Shufer et al. |
| 2011/0289489 | A1 | 11/2011 | Kumar et al. |
| 2012/0198422 | A1 | 8/2012 | Huang et al. |
| 2012/0284567 | A1 | 11/2012 | Bailey et al. |
| 2013/0152047 | A1* | 6/2013 | Moorthi ............ G06F 11/368 717/124 |

OTHER PUBLICATIONS

Evolven Software, "How It Works," (Web Page), copyright 2012, 2 pages, available at http://www.evolven.com/product/how-it-works.html.

Hewlett-Packard Development Company, L.P., "Accelerate Your Manual Testing and Test More, Test Faster, and Quickly Resolve Defects with HP Sprinter," (Research Paper), Data Sheet, Rev. 3, Nov. 2012, 4 pages, available at http://h20195.www2.hp.com/V2/GetDocument.aspx?docname.4AA3-0653ENW&co=us&lc=en.

Hewlett-Packard Development Company, L.P., "HP Sprinter," (Web Page), 2013, 2 pages, available at http://www8.hp.com/us/en/software-solutions/software.html?compURI=1173861.

Hewlett-Packard Development Company, L.P., "HP Universal Discovery Software," (Research Paper), Data Sheet, Rev. 1, Jun. 2012, 8 pages, available at http://h20195.www2.hp.com/V2/GetDocument.aspx?docname=4AA4-1812ENW&cc=us&lc=en.

Hewlett-Packard Development Company, L.P., "HP Universal Discovery," (Web Page), 2013, 2 pages, available at http://www8.hp.com/us/en/software-solutions/software.html?compURI=1234818&jumpid=reg_r1002_usen_c-001_title_r0001#tab=TAB1.

International Preliminary Report on Patentability received in PCT Application No. PCT/US2013/070320, dated May 26, 2016, 6 pages.

International Search Report & Written Opinion received in PCT Application No. PCT/US2013/070320, dated Aug. 19, 2014, 9 pages.

Kekare, H., "Types of Software Testing," (Web Page), Sep. 20, 2011, 4 pages, available at http://www.buzzle.com/articles/types-of-software-testing.html.

Microsoft Corporation, "Black Box and White Box Testing for Application Blocks," (Web Page), Jan. 2005, 20 pages, available at http://msdn.microsoft.com/en-us/library/ff649503.aspx.

Wang, H. J., et al., "Automatic Misconfiguration Troubleshooting with PeerPressure," (Research Paper), OSDI, vol. 4, 2004, pp. 245-257, available at http://www.lib.unb.ca/engineering/usenix/04osdi/tech/full_papers/wang/wang.pdf.

Zeller, A., "Isolating Cause-Effect Chains from Computer Programs," Proceedings of the 10th ACM SIGSOFT Symposium on Foundations of Software Engineering, 2002, 10 pages, available at https://www.st.cs.uni-saarland.de/papers/fse2002/p201-zeller.pdf.

Zhang, S. et al., "Automated Diagnosis of Software Configuration Errors," Proceedings of the 2013 International Conference on Software Engineering, IEEE Press, 2013, pp. 312-321, available at http://homes.cs.washington.edu/~szhang/pdf/confdiagnoser-icse13-zhang.pdf.

* cited by examiner

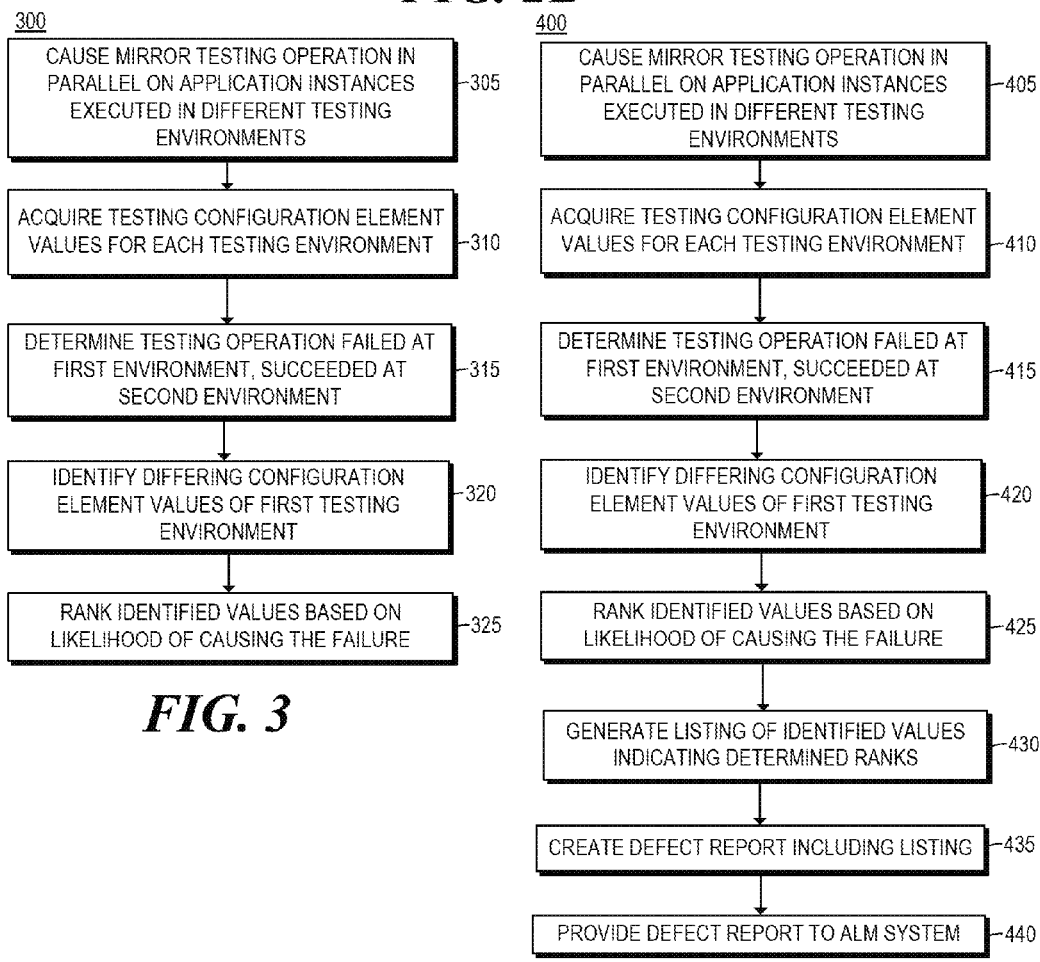

IDENTIFYING A CONFIGURATION ELEMENT VALUE AS A POTENTIAL CAUSE OF A TESTING OPERATION FAILURE

CROSS-REFERENCE TO RELATED APPLICATION

This application is a U.S. National Stage Application of and claims priority to International Patent Application No. PCT/US2013/070320, filed on Nov. 15, 2013, and entitled "IDENTIFYING A CONFIGURATION ELEMENT VALUE AS A POTENTIAL CAUSE OF A TESTING OPERATION FAILURE," the entire contents of which are hereby incorporated in its entirety.

BACKGROUND

In the process of developing a computer application, tests may be performed on the application to determine whether the application functions as designed. For example, several tests may be performed on the application to determine whether there are any defects in the code implementing the application. In some examples, the application may also be tested for multiple different computing environments to determine if the application performs as desired in each of the environments.

BRIEF DESCRIPTION OF THE DRAWINGS

The following detailed description references the drawings, wherein:

FIG. 2B is a diagram of an example collection of configuration element values for different testing environments;

FIG. 3 is a flowchart of an example method for identifying configuration element, values that differ between testing environments; and FIG. 4 is a flowchart of an example method for generating a listing of identified configuration element values indicating a rank of each of the identified values.

DETAILED DESCRIPTION

When a computer application is tested for multiple computing environments with different configurations, it may be determined that the application behaves differently in the different environments. For example, the application may exhibit an undesired behavior in one environment with one configuration, but not in another environment having a different configuration. However, even when such differences in operation are identified, it may be difficult to determine how the different configurations of the environments relate to the differences in application behavior.

To address these issues, examples described herein may cause a testing operation to be performed approximately in parallel on each of a plurality of instances of an application executed in testing environments having different configurations, and acquire configuration element values from each of the testing environments. Examples described herein may further determine that the testing operation failed at a given one of the testing environments and, in response, identify at least one of the configuration element values for the given testing environment as a potential cause of the busting operation failure based on differences between the configuration element values for the different testing environments.

In this manner, examples described herein may compare configurations of different testing environments during mirror testing of an application on the different testing environments, and may identify, in real-time during the mirror testing, potential cause(s) of a testing operation failure in one of the testing environments based on configuration element(s) differing between the testing environments. Such examples described herein may quickly identify configuration issues that may be detrimental to the desired operation of application being tested. In addition, due to the real-time identification of potentially problematic configuration differences during application mirror testing, examples described herein may identify environment configuration issues for an application without first identifying "known good" configurations in which it has previously been determined that the application behaves as desired. As such, examples described herein may, for example, be used to quickly identify configuration element values that may negatively affect a particular code change in an application being tested.

Figure 1:
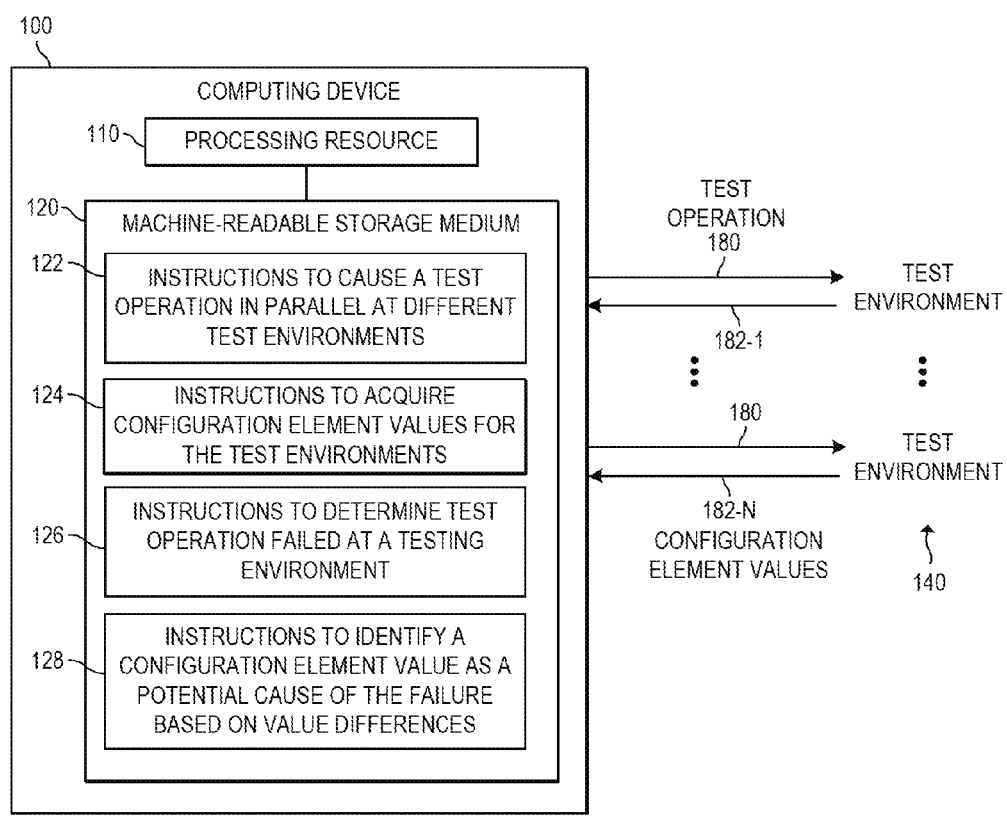
FIG. 1 is a block diagram of an example computing device to identify a potential cause of a test operation failure.

Referring now to the drawings, FIG. 1 is a block diagram of an example computing device 100 to identify a potential cause of a test operation failure. As used herein, a "computing device" may be a desktop computer, notebook computer, workstation, tablet computer, mobile phone, smart device, server, blade enclosure, or any other processing device or equipment. In the example of FIG. 1, computing device 100 includes a processing resource 110 and a machine-readable storage medium 120 encoded with instructions 122, 124, 126, and 128. In some examples, storage medium 120 may include additional instructions. In some examples, instructions 122, 124, 126, and 128, and any other instructions described herein in relation to storage medium 120, may be stored on a machine-readable storage medium remote from but accessible to computing device 100 and processing resource 110.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory.

In the example of FIG. 1, computing device 100 may be in communication with a plurality of testing environments 140, each being capable of executing and performing testing operations on an application. In examples described herein, an "application" (which may be referred to herein as a "computer application") may be any system, component, program, website, web application, or any other type of software implemented in the form of executable instructions encoded on a machine-readable storage medium. As used herein, an "instance" of an application is a copy of an application that may be executed independently of any other copy of the application. Computing device 100 may communicate with testing environments 140 via any suitable computer network. As used herein, a computer network may include, for example, a local area network (LAN), a wireless local area network (WLAN), a virtual private network (VPN), the Internet, or the like, or a combination thereof. In some examples, a computer network may include a telephone network (e.g., a cellular telephone network).

In the example of FIG. 1, instructions 122 may cause a testing operation to be performed approximately in parallel on each of a plurality of instances of an application, each instance executed in a respective one of the plurality of testing environments 140. For example, instructions 122 may cause the testing operation to be performed at each of testing environments 140 by providing, to each of the testing environments 140, a communication 180 instructing testing environments 140 to perform the testing operation.

In some examples, instructions 122 may perform a mirror testing process on an application utilizing the plurality of testing environments 140. In such examples, the testing operation may be a mirror testing operation of the mirror testing process. In examples described herein, a "mirror testing process" (which may be referred to herein as "mirror testing") is a process by which testing operations performed on a first instance of an application executed in a first testing environment are automatically performed on one or more second instances of the application each executed in a different testing environment approximately in parallel. In examples described herein, testing operations performed as part of a mirror testing process may be referred to herein as "mirror testing operations." In examples in which instructions 122 perform a mirror testing process, a testing operation may be invoked on computing device 100 (e.g., by user input or an automated script, etc.) and, in response, instructions 122 may provide communications 180 to each of testing environments 140 to perform that testing operation on the respective instances of the application under test (AUT) by each of testing environments 140. In some examples, each testing operation of a mirror testing process may be performed in this manner and approximately in parallel at each of testing environments 140.

In some examples, the testing environments utilized in a mirror testing process may each have different configurations from one another such that the mirror testing process is able to test the application for a plurality of different computing environments approximately in parallel. In examples described herein, performing a given testing operation "in parallel" or "approximately in parallel" on a plurality of testing environments includes performing the testing operation on each of the testing environments before any subsequent testing operation is performed on any of the testing environments.

Each of testing environments 140 may implement, embody, simulate, or otherwise embody or model a computing environment capable of executing the application. In the example of FIG. 1, testing environments 140 may have different configurations from one another. As used herein, a "configuration" of a computing or testing environment may be defined by a collection of configuration element values describing the computing or testing environment. In examples described herein, a "configuration element" is an aspect of a computing or testing environment that may differ or be configured to differ between computing or testing environments. Example configuration elements may include such environment aspect categories as computing device model type, type of computer network the computing device interacts with (i.e., "network type"), cellular carrier the device interacts with, user interface (UI) language (e.g., English, French, etc.), wireless signal strength of the computing device, and the like.

In examples described herein, a "configuration element value" for a given computer or testing environment may be information indicating a member of a given configuration element category that at least partially defines the computer or testing environment. Possible configuration element values for the computing device model type may include, for example, the respective model types of various smartphones, tablets, or the like. As another example, possible configuration element values for the cellular carrier category may include the various companies offering cellular phone and data services, or the like. The configuration element values for a given testing environment indicate that the testing environment is implemented to have, simulate, or otherwise embody or model a computing environment having a configuration described by those configuration element values. As an example, if the configuration element values for a given testing environment include a first smartphone model, a first cellular carrier, and a first UI language, the configuration element values indicate that the given testing environment is implemented to have, simulate, or otherwise embody or model the computing environment of the first model smartphone, having the first UI language, and operating in connection with (e.g., on the network of) the first cellular carrier.

In examples described herein, computing or testing environments having "different configurations" from one another are computing or testing environments having different configuration element values for the same configuration element, for each of at least one configuration element. In examples described herein, configuration element values for testing environments are different than and separate from any features, configurations, or any other aspects of the application being tested in the testing environments, including its source code or any configuration of the source code or application itself. In examples described herein, respective testing environments have different configuration element value(s), while each testing environment executes and tests equivalent instances of the same application (i.e., based on the same source code, compiled in the same way, etc.).

In the example of FIG. 1, instructions 124 may acquire, from each of testing environments 140, configuration element values for each of testing environments 140. For example, instructions 124 may acquire, from test environments 140, configuration element values 182-1-182-N for test environments 140, respectively, where "N" is an integer greater than one that is equivalent to the number of testing environments from which configuration element values are acquired. Each of configuration element values 182-1-182-N may include one or a plurality of configuration element values for a respective one of test environments 140, the configuration element values for each testing environment defining the configuration of that testing environment.

Instructions 126 may determine that the testing operation faded at a given one of testing environments 140. For example, instructions 126 may determine that the that the testing operation failed at the given testing environment in response to receiving input indicating that the testing operation failed at the given testing environment. For example, a user of computing device 100 may provide input to computing device 100 as part of a mirror testing process implemented by instructions 122. For example, the user may provide input indicating a testing operation for instructions 122 to trigger at each of test environments 140. In such examples, the user of computing device 100 may detect that the testing operation failed at the given testing environment, and may provide user input to computing device 100 indicating that the testing operation failed at the given testing environment. For example, the user of computing device 100 may provide such input in response to detecting that the testing operation, at the given testing environment, faded to complete, produced an application state different than the state produced at other testing environments, failed to validate when the testing operation is a validation operation, or the like.

In some examples, instructions 126 may determine that a testing operation succeeded at a given testing environment in response to user input or independent of user input. For example, instructions 126 may determine that the testing operation succeeded at a given testing environment if instructions 126 do not receive any indication (e.g., from a testing engine in communication with the testing environment) that an error condition or possible error condition occurred at the given testing environment. In some examples, instructions 126 may determine that the testing operation succeeded when no such error condition was detected, or in response to user input indicating that the test environment succeeded after receiving an indication of a possible error condition for the given testing environment. In such examples, a user of computing device 100 may be alerted of the possible error condition at the given testing environment, and may check the given testing environment in response. If the user confirms that no error condition exists, the user may provide input indicating that there is no error condition at the given testing environment (e.g., indicating that the testing operation has succeeded at the given testing environment).

In other examples, instructions 126 may determine that the testing operation failed at the given testing environment independent of user input. For example, the testing operation may be a validation operation to determine whether each instance of the application at each testing environment has an expected state, output, display (e.g., of content, GUI elements, etc.), or the like. In such examples, instructions 126 may determine that the validation operation failed without user input. In such examples, instructions 126 may determine that the operation failed in response to receiving an indication of the failure from a computing device implementing the testing environment, which may detect the failure of the operation.

In response to the determination that the testing operation failed at the given testing environments, instructions 128 may identify at least one of the configuration element values for the given testing environment as a potential cause of the testing operation failure based on differences between the configuration element values for the different testing environments 140. For example, instructions 128 may identify at least one configuration element value for the given testing environment as a potential cause of the testing operation failure based on the at least one configuration element value being different than a value of the same configuration element for at least one other testing environment where the testing operation succeeded.

In some examples, instructions 128 may identify a configuration element value for the given testing environment as a potential cause of the testing operation failure based on the configuration element value being different than a value of the same configuration element for each of testing environments 140 where the testing operation succeeded. In such examples, instructions 128 may identify, as a potential cause of the testing operation failure, a configuration element value for the given testing environment that is not shared by any other testing environment in which the same testing operation succeeded. In other examples, instructions 128 may identify, as a potential cause of the testing operation failure, a configuration element value shared by at least one of the testing environments where the testing operation succeeded and not shared by at least one other of the testing environments where the testing operation succeeded. For example, instructions 128 may utilize a tolerance threshold to determine whether to identify a given configuration element value even if it is shared by at least one testing environment where the testing operation succeeded.

In some examples, instructions 128 may identify a plurality of the configuration element values for the given testing environment as potential causes of the test operation failure, based on each of the plurality of values being different than respective values of the same configuration elements for at least one other of the plurality of testing environments where the testing operation succeeded. In some examples, instructions 128 may identify, as potential causes of the testing operation failure, a plurality of configuration element values for the given testing environment that are not shared by any other testing environment in which the same testing operation succeeded. In some examples, instructions 128 may identify configuration element value(s) for the given testing environment as described below in relation to FIGS. 2A and 2B.

In examples in which instructions 128 identify a plurality of configuration element values, instructions 128 may rank the identified configuration element values based on, for each of the identified values, the likelihood of the identified value being a cause of the failure. For example, instructions 128 may rank identified configuration elements values at least in part based on, for each identified configuration element value, the number (e.g., percentage, ratio, etc.) of testing environments of the total having the identified value in which the testing operation failed. In some examples, instructions 128 may rank the identified configuration element values based on configuration element priorities (or rules, etc.) indicating which configuration elements or configuration element values have a greater likelihood of being the cause of a testing operation failure. Such configuration element priorities may be predetermined or automatically determined by instructions 128. As an example, such configuration element priorities may indicate, for example, that a network type configuration element value (e.g., WIFI, 3G, etc.) for a testing environment may be more likely than values for other types of configuration elements to be the cause of a testing operation failure.

In some examples, instructions 128 may output a listing of the identified configuration element values, the listing indicating the determined rank of each of the identified configuration element values. For example, instructions 128 may output the listing as a ranked report of the identified configuration values, which may be stored in a machine-readable storage medium of or accessible to computing device 100. In other examples, instructions 128 may output the listing by displaying the listing on a display device, such as a computing device monitor, screen, or the like. In other examples, instructions 128 may output the listing in any other suitable manner.

As described above, instructions 124 may acquire, configuration element values 182-1-182-N for test environments 140, respectively. In some examples, one or more of the testing environments 140 may be implemented on computing device(s) separate from computing device 100 each having a test engine to collect configuration element values for the testing environment(s) implemented on the computing device. In such examples, instructions 124 may acquire configuration element values for such testing environments from the respective test engines. Such test engines are described in more detail below in relation to FIG. 2A. In some examples, at least one of testing environments 140 may be implemented on computing device 100, and instructions 124 may acquire the configuration element values for the at least one testing environment implemented on computing device 100.

In some examples, instructions 124 may acquire configuration element values 182-1-182-N from respective testing environments 140 in response to the determination by instructions 126 that the testing operation failed at least at the given testing environment. In other examples, instructions 124 may acquire configuration elements 182-1-182-N continually during the operation of the testing (e.g., mirror testing) process operated by instructions 122.

In some examples, instructions 122, 124, 126, and 128 may be part of an installation package that, when installed, may be executed by processing resource 110 to implement the functionalities described herein in relation to instructions 122, 124, 126, and 128. In such examples, storage medium 120 may be a portable medium, such as a CD, DVD, or flash drive, or a memory maintained by a server from which the installation package can be downloaded and installed. In other examples, instructions 122, 124, 126, and 128 may be part of an application, applications, or component already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2A-4.

Figure 2A:
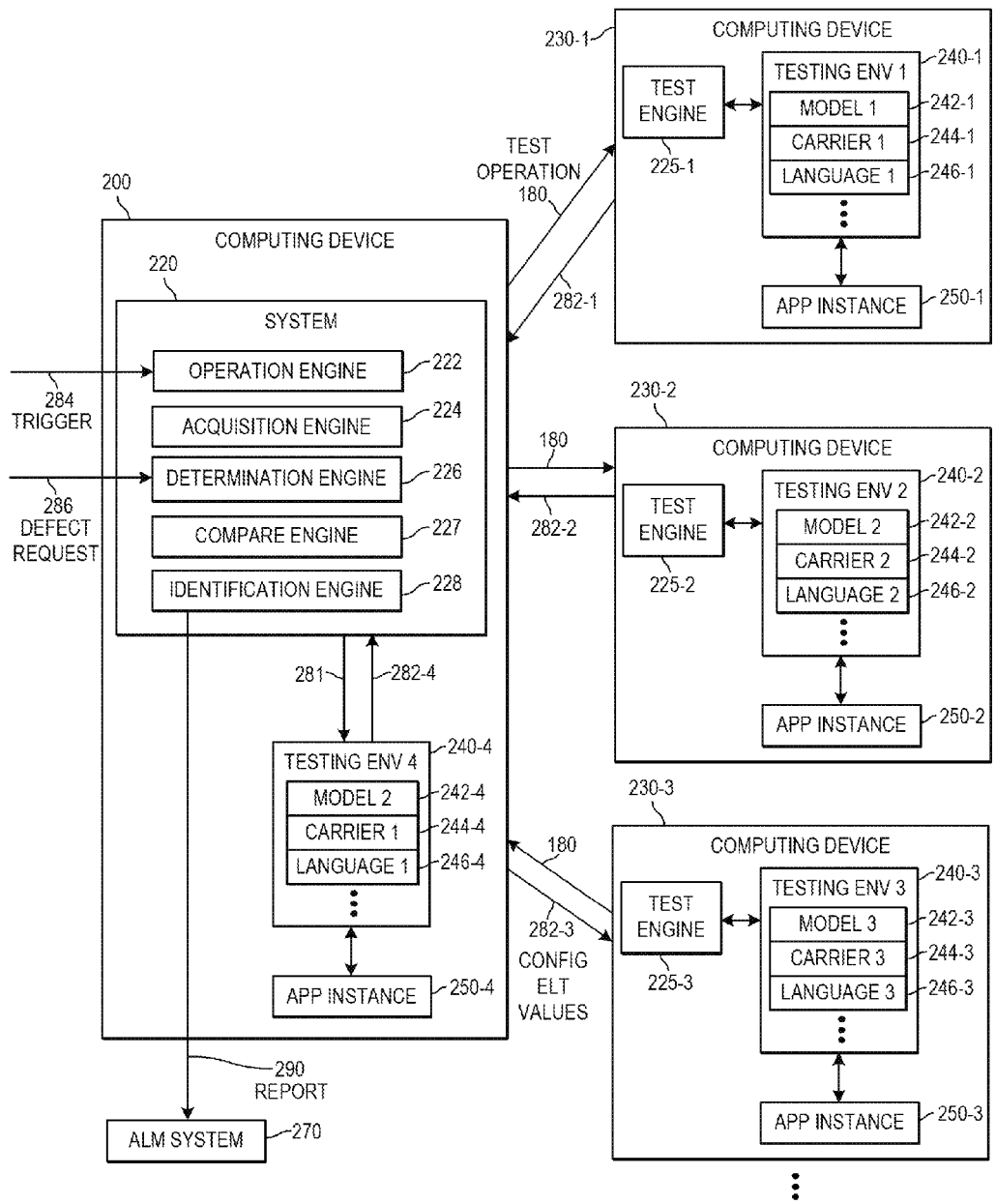
FIG. 2A is a block diagram of an example system to identify a configuration element value as a potential cause of a test operation failure.

FIG. 2A is a block diagram of an example system 220 to identify a configuration element value as a potential cause of a test operation failure. In the example of FIG. 2A, a computing device 200 comprises system 220, which includes engines 222, 224, 226, 227, and 228. In some examples, system 220 may include additional engines.

Each of the engines of system 220 may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 220. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices, in other examples, the functionalities of any of the engines may be implemented in the form of electronic circuitry.

In some examples, the instructions can be part of an installation package that, when installed, can be executed by the processing resource to implement system 220. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

System 220 of computing device 200 may be in communication with at least one other computing device. In the example of FIG. 2A, system 220 is in communication with at least computing devices 230-1, 230-2, and 230-3. System 220 may communicate with other computing devices, including computing devices 230-1-230-3, via any suitable computer network, as described above in relation to FIG. 1.

In the example of FIG. 2A, computing devices 230-1-230-3 may each implement respective testing environments having different configurations, and may include respective test engines 225-1-225-3 in communication with testing environments 240-1-240-3 and system 220. Test engines 225-1-225-3 may collect configuration element values from the respective testing environments 240-1-240-2 and provide the collected values to system 220. Each of test engines 225-1-225-3 may be any combination of hardware and programming to implement the functionalities of the test engine, as described above in relation to the engines of system 220.

In the example of FIG. 2A, computing device 230-1 implements a testing environment 240-1 having a plurality of configuration element values, including at least a device model type value 242-1 (e.g., "model 1"), a cellular carrier value 244-1 (e.g., "carrier 1"), and UI language value 246-1 (e.g., "language 1"). Testing environment 240-1 may have one or a plurality of additional configuration element values. Such configuration element values may include values for any of a plurality of different configuration elements such as, for example, network type, screen resolution, operating system (OS) (e.g., type and version), hardware type (e.g., type of camera, or other hardware), or the like. Some of these configuration element values may be static (i.e., remain unchanged) over the course of the testing of an application in the testing environment. The configuration element values for testing environment 240-1 may also include values for other configuration elements that may change over the course of a testing (e.g., mirror testing) process such as, for example, global positioning system (GPS) coordinates, wireless signal strength, whether a wireless interface is on or off, various hardware usage metrics, or the like.

In the example of FIG. 2A, a first instance 250-1 of an application (e.g., an application under test (AUT)) is executed in testing environment 240-1. Test engine 225-1 of computing device 230-1 may, in response to instructions from system 220, cause testing operations of a testing (e.g., mirror testing) process to be performed on application instance 250-1 executed in testing environment 240-1. As noted above, test engine 225-1 may collect configuration element values for testing environment 240-1 and provide the collected values to system 220.

The example of FIG. 2A is described in relation to a mobile application to be executed in a mobile computing environment (e.g., on a smartphone or the like). In other examples, the application under test may be any other type of application, such as an application for a notebook or desktop computer, a web application, or the like. In such examples, the testing environments may be suitable for such application and have suitable configuration elements and configuration element values. For example, when the application under test is a web application, the configuration element values for the testing environments may include values for configuration elements such as OS type, OS version, database type, browser type, and the like.

Computing device 230-2 implements a testing environment 240-2 having a plurality of configuration element values, including at least a device model type value 242-2 (i.e., "model 2"), a cellular carrier value 244-2 (i.e., "carrier 2"), and UI language value 246-2 (i.e., "language 2"). Testing environment 240-2 may have additional configuration element value(s), such as those described above. A second instance 250-2 of the application under test is executed in testing environment 240-2. Test engine 225-2 of computing device 230-2 may, in response to instructions from system 220, cause testing operations of a testing (e.g., mirror testing) process to be performed on application instance 250-2 executed in testing environment 240-2. As noted above, test engine 225-2 may collect configuration element values for testing environment 240-2 and provide the collected values to system 220.

Computing device 230-3 implements a testing environment 240-3 having a plurality of configuration element values, including at least a device model type value 242-3 (i.e., "model 3"), a cellular carrier value 244-3 (i.e., "carrier 3"), and UI language value 246-3 (i.e., "language 3"). Testing environment 240-2 may have additional configuration element value(s), such as those described above. A third instance 250-3 of the application under test is executed in testing environment 240-3. Test engine 225-3 of computing device 230-3 may, in response to instructions from system 220, cause testing operations of a testing (e.g., mirror testing) process to be performed on application instance 250-3 executed in testing environment 240-3. As noted above, test engine 225-3 may collect configuration element values for testing environment 240-3 and provide the collected values to system 220. In the example of FIG. 2A, each of testing environments 240-1-240-3 have different configuration element values for device model type, cellular carrier, and UI language, as indicated by the different numbers (e.g., 1, 2, 3) included in the examples values (e.g., "model 1", "model 2," etc.).

In some examples, computing device 200, in addition to including system 220 to operate the testing (e.g., mirror testing) process, may also implement a testing environment 240-4 having a plurality of configuration element values, including at least a device model type value 242-4 (i.e., "model 2"), a cellular carrier value 244-4 (i.e., "carrier 1"), and UI language value 246-4 (i.e., "language 1"). Testing environment 240-4 may have additional configuration element value(s), such as those described above. A fourth instance 250-4 of the application under test is executed in testing environment 240-4, which system 220 may communicate with directly. In the example of FIG. 2A, testing environment 240-4 may share configuration element values with various other testing environments. For example, testing environment 240-4 may share its device model type value 242-4 (e.g., "model 2") with testing environment 240-2, and may share its cellular carrier value 244-4 (e.g., "carrier 1") and UI language value (i.e., "language 1") with testing environment 240-1.

In the example of FIG. 2A, operation engine 222 may cause a mirror testing operation of a mirror testing process to be performed approximately in parallel on each of a plurality of instances 250-1-250-4 of the application under test. As described above, each of the instances 250-1-250-4 is executed in a respective one of testing environments 240-1-240-4 having different configurations from one another. In some examples, engine 222 may receive a mirror testing operation trigger 284 and, in response to trigger 284, may cause the mirror testing operation to be performed on instances 250-1-250-4 in testing environments 240-1-240-4.

In some examples, as part of a mirror testing process of system 220, a user of computing device 200 may provide input to computing device 200 invoke a testing operation on application instance 250-4 executed on computing device 200. In such examples, this user input may include trigger 284, and in response, engine 222 may cause the same testing operation (i.e., mirror testing operation) invoked by the input to be performed on application instances 250-1-250-3 by providing, to each of test engines 225-1-225-3, a communication 180 instructing test engines 225-1-225-3 to cause the same testing operation to be performed on application instances 250-1-250-3. In response to communication 180, each of test engines 225-1-225-3 may cause the mirror testing operation to be performed on each of application instances 250-1-250-3. In some examples, each mirror testing operation of a mirror testing process of system 220 may be performed in this manner by performing a testing operation on each application instances in response to a testing operation triggered by user input. In some examples, the triggering user input may include input invoking the testing operation on one of the application instances (e.g., instance 250-4 executing on computing device 200). In such examples, in response to the user input (e.g., including trigger 284), engine 222 may provide a communication 281 to testing environment 240-4 to perform the testing operation on instance 250-4.

In the example of FIG. 2A, acquisition engine 224 may acquire, from testing environments 240-1-240-4, configuration element values 282-1-282-4 for testing environments 240-1-240-4, respectively. Configuration element values 282-1-282-4 may define the respective configurations of testing environments 240-1-240-4. In some examples, for at least one of the testing environments 240-1-240-3, engine 224 may acquire the configuration element values for the testing environment from a respective testing engine of a respective computing device implementing the testing environment. For example, in the example of FIG. 2A, engine 224 may acquire configuration element values 282-1-282-3, for testing environments 240-1-240-3, from respective testing agents 225-1-225-3.

In the example of FIG. 2A, determination engine 226 may determine that the mirror testing operation failed at least at a given one of the testing environments and succeeded at least at another one of the testing environments. For example, engine 226 may determine that the mirror testing operation failed at testing environment 240-1 but succeeded at each of testing environments 240-2-240-4. For example, as described above in relation to instructions 126 of FIG. 1, engine 226 may determine that the that the mirror testing operation failed at the given testing environment in response to receiving input (e.g., user input) indicating that the testing operation failed at the given testing environment. In other examples, engine 226 may determine that the testing operation failed at the given testing environment independent of user input, as described above in relation to instructions 126 of FIG. 1. For example, engine 226 may determine that the mirror testing test operation failed at a given testing environment 240-1 in response to a first indication that the test operation failed, received by the determination engine from testing engine 225-1 of computing device 230-1. In such examples, engine 226 may determine that the mirror testing operation succeeded at another testing environment, such as testing environment 240-2, in response to another indication that the mirror testing operation succeeded received by determination engine 226 from testing engine 225-2 of computing device 230-2. In some examples, engine 226 may determine that the mirror testing operation failed at one testing environment and succeeded at another testing environment when the mirror testing operation is a validation operation, as described above in relation to FIG. 1. In some examples, engine 226 may determine that a testing operation succeeded at a given testing environment in response to user input or independent of user input, as described above in relation to instructions 126 of FIG. 1.

In some examples, acquisition engine 224 may acquire configuration element values 282-1-282-4 from respective testing environments 240-1-240-4 in response to the determination by engine 226 that the testing operation failed at least at the given testing environment, as described above in relation to FIG. 1, in other examples, engine 224 may acquire configuration elements 282-1-282-4 continually during the operation of the testing (e.g., mirror testing) process operated by engine 222, as described above in relation to FIG. 1.

In some examples, acquisition engine 224 may acquire the configuration element values 282-1-282-4 for testing environments 240-1-240-4 in response to trigger 284 for the mirror testing operation and prior to operation engine 222 causing the test operation to be performed on application instances 250-1-250-4. In other examples, each time a change occurs in one of the testing environments 240-1-240-4, acquisition engine 224 may receive a notification of the change.

In the example of FIG. 2A, compare engine 227 may, in response to the determination of engine 226, compare the configuration element values for the given testing environment to the respective configuration element values for at least one testing environment at which the mirror testing operation succeeded. For example, in response to the determination of engine 226, compare engine 227 may compare the configuration element values 282-1 for testing environment 240-1 to the respective configuration element values 282-2-282-4 for each of testing environments 240-2-240-4 at which the mirror testing operation succeeded.

Identification engine 228 may identify, as a potential cause of the mirror testing operation failure, one of the configuration element values 282-1 of the given testing environment that differs from the respective value of the same configuration element for the second testing environment. In some examples, engine 228 may identify one of the configuration element values 282-1 of the given testing environment in any manner described above in relation to FIG. 1. For example, engine 228 may identify a configuration element value for the given testing environment as a potential cause of the testing operation failure based on the configuration element value being different than a value of the same configuration element for each of the testing environments where the testing operation succeeded. For example, engine 228 may identify, as a potential cause of the testing operation failure, a configuration element value for the given testing environment that is not shared by any other testing environment in which the same testing operation succeeded.

In some examples, engine 228 may identify a plurality of the configuration element values 282-1 for the given testing environment as potential causes of the test operation failure, based on each of the plurality of values being different than respective values of the same configuration elements for at least one other of the plurality of testing environments where the testing operation succeeded. In some examples, engine 228 may identify, as potential causes of the testing operation failure, a plurality of configuration element values for the given testing environment that are not shared by any other testing environment in which the same testing operation succeeded.

In some examples, engine 228 may output a listing of the identified configuration element values, as described above in relation to FIG. 1. In some examples, engine 228 may rank the identified configuration elements, as described above in relation to FIG. 1. In such examples, the output listing may indicate the determined rank of each of the identified configuration element values.

As noted above, engine 226 may determine that the mirror testing operation failed at the given testing environment in response to receiving input (e.g., user input) indicating that the testing operation failed at the given testing environment. In some examples, the input may be a request 286 to report a defect in the application based on the mirror testing operation failure. For example, a user of computing device 200 may input the request 286 to report a defect in response to detecting the mirror testing operation failure at the given testing environment (e.g., testing environment 240-1). In such examples, in response to system 220 receiving request 286, acquisition engine 224 may acquire the configuration element values 282-1-282-4 from testing environments 240-1-240-4, and compare engine 227 may compare the acquired configuration element values 282-1-282-4 to identify configuration element value(s) as potential cause(s) of the failure, as described herein.

After identifying configuration element value(s), engine 228 may generate a listing of the identified configuration element values, which may indicate determined rankings of the identified values. In some examples, in response to the defect request 286, engine 228 may create a defect report 290 based on the failure of the mirror testing operation at the given testing environment. In such examples, the defect report 290 may include the listing generated by engine 228. Engine 228 may provide the defect report 290 to an application lifecycle management (ALM) system 270 such that the defect report 290 is associated with the application under test in the ALM system 270.

Although examples are described herein in relation to the example of FIG. 2A in which four testing environments implemented on four different computing devices are shown, in other examples, the mirror testing process and identification of configuration element values may be performed with more or fewer testing environments, more or fewer computing devices, or a combination thereof. In some examples, functionalities described herein in relation to FIG. 2A may be provided in combination with functionalities described herein in relation to any of FIGS. 1 and 2B-4.

FIG. 2B is a diagram of an example collection of configuration element values for different testing environments. FIG. 2B will be described herein in relation to the example of FIG. 2A. In the example of FIG. 2B, the collection of configuration element values is presented in the form of a table 295 for illustrative purposes, and includes at least some of configuration element values 282-1-282-4 of testing environments 240-1-240-4 of FIG. 2A. In table 295, column 295A indicates various configuration elements of testing environments 240-1-240-4. Column 295B includes the configuration element values 242-1, 244-1, and 246-1 of testing environment 240-1, and column 295C includes the configuration element values 242-2, 244-2, and 246-2 of testing environment 240-2. Column 295D includes the configuration element values 242-3, 244-3, and 246-3 of testing environment 240-3, and column 295E includes the configuration element values 242-4, 244-4, and 246-4 of testing environment 240-4.

As described above in relation to FIG. 2A, engine 228 may identify, as a potential cause of the testing operation failure, a configuration element value for the given testing environment that is not shared by any other testing environment in which the same testing operation succeeded. As an example, in the example of FIG. 2A, determination engine 226 may determine that a mirror testing operation has failed at testing environment 240-1, and succeeded at each of testing environments 240-2-240-4. In such examples, after acquisition engine 224 acquires the configuration element values shown in table 295, compare engine 227 may compare the configuration element values of testing environment 240-1 (illustrated in column 295B) to the configuration element values of testing environments 240-2-240-4 (illustrated in columns 295C-295D, respectively).

For example, comparison engine 227 may perform comparisons such that identification engine 228 may identify configuration element values as potential causes of the failure. In some examples, engine 227 may first eliminate any configuration element values shared by all of the testing environments, which in the example of FIGS. 2A and 2B, is none. In some examples, engine 227 may then eliminate from consideration configuration element values shared by testing environment(s) that failed the testing operation and testing environment(s) that succeeded. In this manner, engine 227 may eliminate the "carrier 1" value of column 295B, as it is shared by the failing testing environment 240-1 of column 295B and the succeeding testing environment 240-4 of column 295E. Engine 227 may also eliminate the "language 1" value of column 295B, as it is shared by the failing testing environment 240-1 of column 295B and the succeeding testing environment 240-4 of column 295E. As such, the "model 1" configuration element value of 295B remains, which is not shared by any of the succeeding testing environments. In such examples, identification engine 228 may identify the configuration element value "model 1" as a possible cause of the mirror testing operation failure, indicating that the model type of testing environment 240-1 may be the cause of the failure.

As noted above in relation to FIG. 2A, in some examples, engine 228 may output a listing of the identified configuration element values. In the example described in relation to FIG. 2B, engine 228 may output "model 1". In other examples, engine 228 may output table 295 with "model 1" in column 295B emphasized to indicate that it is identified as a possible cause of the failure (e.g., as illustrated in bold and surrounded by a bold outline). As noted above in relation to FIG. 1, there may be a tolerance threshold when determining whether to identify configuration element values as potential causes of the failure. In such examples, engine 228 may identify "carrier 1" and "language 1" as potential causes of the failure (e.g., as illustrated in bold but without bold outline), even though they are included in one failing testing environment. In some examples, functionalities described herein in relation to FIGS. 2A-2B may be provided in combination with functionalities described herein in relation to any of FIGS. 1 and 3-4.

FIG. 3 is a flowchart of an example method 300 for identifying configuration element values that differ between testing environments. Although execution of method 300 is described below with reference to system 220 of FIG. 2A described above, other suitable systems for the execution of method 300 can be utilized (e.g., computing device 100). Additionally, implementation of method 300 is not limited to such examples.

At 305 of method 300, engine 222 may cause a mirror testing operation to be performed in parallel on each of a plurality of instances of an application, wherein each instance is executed in a respective one of a plurality of testing environments having different configurations from one another, as described above. At 310, engine 224 may acquire, from each of the testing environments, configuration element values for the testing environment. In such examples, for each testing environment, the configuration element values may define the configuration of the testing environment.

At 315, engine 226 may determine that the mirror testing operation has failed at a first testing environment of the plurality of testing environments and has passed at least one second testing environment of the plurality of testing environments. At 320, in response to the determination, engine 228 may identify, as potential causes of the failure, a plurality of configuration element values for the first testing environment that differ from the respective values of the same configuration element for each of at least one of the second testing environments. At 325, engine 228 may rank the identified configuration element values of the first testing environment based on, for each of the identified values, the likelihood of the identified value being a cause of the failure.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2B and 4.

FIG. 4 is a flowchart of an example method 400 for generating a listing of identified configuration element values indicating a rank of each of the identified values. Although execution of method 400 is described below with reference to system 220 of FIG. 2A described above, other suitable systems for the execution of method 400 can be utilized (e.g., computing device 100). Additionally, implementation of method 400 is not limited to such examples.

At 405 of method 400, engine 222 may cause a mirror testing operation to be performed in parallel on each of a plurality of instances of an application, wherein each instance is executed in a respective one of a plurality of testing environments having different configurations from one another, as described above. At 410, engine 224 may acquire, from each of the testing environments, configuration element values for the testing environment. In such examples, for each testing environment, the configuration element values may define the configuration of the testing environment.

At 415, engine 226 may determine that the mirror testing operation has failed at a first testing environment of the plurality of testing environments and has passed at least one second testing environment of the plurality of testing environments. At 420, in response to the determination, engine 228 may identify, as potential causes of the failure, a plurality of configuration element values for the first testing environment that differ from the respective values of the same configuration element for each of at least one of the second testing environments. At 425, engine 228 may rank the identified configuration element values of the first testing environment based on, for each of the identified values, the likelihood of the identified value being a cause of the failure. In some examples, engine 228 may rank the identified configuration element values based on predetermined configuration element priorities, as described above in relation to FIG. 1.

At 430, engine 228 may generate a listing of the identified configuration element values. In some examples, the listing may indicate the determined rank of each of the identified configuration element values. At 435, engine 228 may create a defect report based on the failure of the mirror testing operation at the first testing environment, as described above in relation to FIG. 2A. In some examples, the defect report may include the generated listing. At 440, engine 228 may provide the defect report 290 to an ALM system 270 such that the defect report 290 is associated with the application under test in the ALM system 270.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium comprising instructions that when executed by a processing resource of a computing device cause the processing resource to:
   cause a testing operation to be performed approximately in parallel on each of a plurality of instances of an application, each instance executed in a respective one of a plurality of testing environments having different configurations from one another;
   acquire, from each of the testing environments, configuration element values for the testing environment, the values defining the configuration of the testing environment;
   determine that the testing operation has failed at a first one of the testing environments and has passed at a second one of the testing environments; and
   in response to the determination, identify one of the configuration element values acquired from the first testing environment as a potential cause of the testing operation failure based on differences between the configuration element values acquired from the first testing environment and the configuration element values acquired from the second testing environment.

2. The storage medium of claim 1, wherein the instructions are to cause the processor to acquire the configuration element values from each of the testing environment in response to the determination that the testing operation has failed at the first testing environment.

3. The storage medium of claim 2, wherein:
   the processor is to determine that the testing operation has failed at the first testing environment in response to receiving an input indicating that the testing operation has failed at the first testing environment;
   the processor is to cause the testing operation to be performed the testing operation of a mirror testing process utilizing the plurality of testing environments.

4. The storage medium of claim 1, wherein the processor is to identify, as a potential cause of the testing operation failure, the configuration element value acquired from the first testing environment based on the configuration element value being different than a value of the same configuration element acquired from the second testing environment where the testing operation has succeeded.

5. The storage medium of claim 1, wherein the processor is to identify a plurality of the configuration element values acquired from the first testing environment as potential causes of the test operation failure, based on each of the plurality of configuration element values being different than respective values of the same configuration elements acquired from other ones of the plurality of testing environments where the testing operation has succeeded.

6. The storage medium of claim 5, wherein the instructions are to cause the processor to:
   rank the identified configuration element values based on, for each of the identified configuration element values, a likelihood of the identified value being a cause of the failure; and
   output a listing of the identified configuration element values, the listing indicating the determined rank of each of the identified configuration element values.

7. A system comprising:
   a processor; and
   a memory storing instructions that when executed by the processor cause the processor to:
   cause a mirror testing operation of a mirror testing process to be performed approximately in parallel on each of a plurality of instances of an application, each instance executed in a respective one of a plurality of testing environments having different configurations from one another;
   acquire, from each of the testing environments, configuration element values for the testing environment, the values defining the configuration of the testing environment;
   determine that the mirror testing operation has failed at a first one of the testing environments and succeeded at a second one of the testing environments;
   in response to the determination, compare the configuration element values for the first testing environment to the configuration element values for the second testing environment, respectively; and
   identify, as a potential cause of the mirror testing operation failure, one of the configuration element values acquired from the first testing environment that differs from the respective value of the same configuration element acquired from the second testing environment.

8. The system of claim 7, wherein the instructions are to cause the processor to determine that the mirror testing operation has failed at the first testing environment in response to receiving an input indicating that the mirror testing operation failed at the first testing environment.

9. The system of claim 8, wherein:
   the input is a request to report a defect in the application based on the mirror testing operation failure;
   the instructions are to cause the processor to:

acquire the configuration element values from the testing environments in response to the system receiving the request; and compare the configuration element values in response to the system receiving the request.

10. The system of claim 7, wherein the instructions are to cause the processor to:

determine that the mirror testing operation has failed at the first testing environment in response to a first indication that the mirror testing operation has failed received from a first testing engine of a first computing device implementing the first testing environment; and determine that the mirror testing operation has succeeded at the second testing environment in response to a second indication that the mirror testing operation has succeeded received from a second testing engine of a second computing device implementing the second testing environment.

11. The system of claim 7, wherein the instructions are to cause the processor to:

for one of the testing environments, acquire the configuration element values for the testing environment from a testing engine of a computing device implementing the testing environment, wherein the testing engine is in communication with the testing environment;

wherein the testing environments are each included on different computing devices.

12. The system of claim 7, wherein the instructions are to cause the processor to:

cause the mirror testing operation in response to receiving a mirror testing operation trigger; and acquire the configuration element values for the first testing environment in response to the mirror testing operation trigger and prior to the processor causing the test operation to be performed on the instance of the application executed in the first testing environment.

13. A method comprising:

causing, by a processor of a computing device, a mirror testing operation to be performed in parallel on each of a plurality of instances of an application, wherein each instance is executed in a respective one of a plurality of testing environments having different configurations from one another;

acquiring, from each of the testing environments, configuration element values for the testing environment, the values defining the configuration of the testing environment;

determining, by the processor, that the mirror testing operation has failed at a first testing environment of the plurality of testing environments and has passed at a second testing environment of the plurality of testing environments;

in response to the determination, identifying, as potential causes of the failure, a plurality of configuration element values acquired from the first testing environment that differ from the respective values of the same configuration elements acquired from the second testing environment; and ranking, by the processor, the identified configuration element values acquired from the first testing environment based on, for each of the identified values, a likelihood of the identified value being a cause of the failure.

14. The method of claim 13, wherein:

the ranking comprises ranking the identified configuration element values based on predetermined configuration element priorities.

15. The method of claim 14, further comprising:

generating a listing of the identified configuration element values, the listing indicating the determined rank of each of the identified configuration element values;

creating a defect report based on the failure of the mirror testing operation at the first testing environment, the defect report including the generated listing; and providing the defect report to an application lifecycle management (ALM) system such that the defect report is associated with the application in the ALM system.

* * * * *